United States Patent [19]
Funk et al.

[11] Patent Number: 5,253,827
[45] Date of Patent: Oct. 19, 1993

[54] CHAIN DRIVEN, RAIL GUIDED PAYLOAD DEPLOYMENT SYSTEM

[75] Inventors: Glen E. Funk, Chino; Edwin E. Henkel, Lakewood, both of Calif.

[73] Assignee: Rockwell International Corporation, Seal Beach, Calif.

[21] Appl. No.: 767,591

[22] Filed: Sep. 30, 1991

[51] Int. Cl.$^5$ ............................................... B64G 1/64
[52] U.S. Cl. ................................ 244/158 R; 89/1.54; 124/1; 244/137.1
[58] Field of Search ............... 244/158 R, 137.1, 161; 89/1.54; 124/1, 82; 221/75

[56] References Cited

U.S. PATENT DOCUMENTS

| | | | |
|---|---|---|---|
| 2,891,636 | 6/1959 | Krieger et al. | 187/8.59 |
| 4,457,401 | 7/1984 | Taylor et al. | 187/8.59 |
| 5,129,601 | 7/1992 | Henkel | 244/158 R |

*Primary Examiner*—Galen Barefoot
*Attorney, Agent, or Firm*—Lawrence N. Ginsberg; Charles T. Silberberg

[57] ABSTRACT

A deployment system comprises a plurality of parallel linear guide rails, securely supported at their respective bases to a deployment portion of the spacecraft. Each of these linear guide rails contains a drive chain which is powered by a motor(s)/output gear box during the deployment sequence. The guide rail chain mechanisms are coupled to each other by means of drive shafts. Therefore, the drive shafts serve a dual purpose: 1) distribute power between the guide rail chain mechanisms as needed and 2) synchronize the guide rail mechanisms. A payload is provided having attach fittings located thereon for engagement with the linear guide rails. These fittings engage the drive chain. In this manner, the motion of the chain drives the payload fittings along the linear guide rails. During deployment, motion of the chains is produced by the motor(s), which accelerate the payload along the length of the guide rails. Since the length of the acceleration motion is large (versus the short strokes of spring loaded pistons), only small acceleration forces are required to reach the final separation velocity. At the ends of the guide rails, the chains pass over pulleys, reversing their direction. At this point, the payload fitting is allowed to disengage the chain and simply run off the ends of the guide rails.

6 Claims, 7 Drawing Sheets

CHAIN DRIVEN, RAIL GUIDED PAYLOAD DEPLOYMENT SYSTEM

STATEMENT OF GOVERNMENT INTEREST

This invention was made with Government support under Contract No. F04701-89-C-0005-S awarded by the U.S. Air Force. The Government has certain rights in this invention.

BACKGROUND OF THE INVENTION

1. Field of the Invention

The present invention relates to the deployment of payloads from spacecraft.

2. Description of the Related Art

Most of the devices presently used for deploying payloads from spacecraft depend on pyrotechnic devices, frequently utilizing spring-loaded pistons to impart necessary separation velocities. Such devices result in a relatively short separation stroke necessitating the use of relatively high forces. This, combined with uncertainties in the payload's center of mass, often results in undesirable tip off rates. Additionally, spring failure scenarios often dictate wide design margins to insure no re-contact of space vehicles.

OBJECTS AND SUMMARY OF THE INVENTION

It is, therefore, a principal object of the present invention to deploy payloads using low acceleration forces with minimum tip off rates.

Another object is to provide a safe deployment system and one which obviates the need for pyrotechnic devices.

These objects are achieved by the present invention, which in its broadest aspects comprises a plurality of parallel linear guide rails, securely supported at their respective bases to a deployment portion of the spacecraft. Each of these linear guide rails contains a drive chain which is powered by a motor(s)/output gear box during the deployment sequence. The guide rail chain mechanisms are coupled to each other by means of drive shafts. Therefore, the drive shafts serve a dual purpose: 1) distribute power between the guide rail chain mechanisms as needed and 2) synchronize the guide rail mechanisms. A payload is provided having attach fittings located thereon for engagement with the linear guide rails. These fittings engage the drive chain. In this manner, the motion of the chain drives the payload fittings along the linear guide rails. During deployment, motion of the chains is produced by the motor(s), which accelerate the payload along the length of the guide rails. Since the length of the acceleration motion is large (versus the short strokes of spring loaded pistons), only small acceleration forces are required to reach the final separation velocity. At the ends of the guide rails, the chains pass over pulleys, reversing their direction. At this point, the payload fitting is allowed to disengage the chain and simply run off the ends of the guide rails.

The use of these linear guide rails in conjunction with chain drive mechanisms constrains the payload deployment motion to uniaxial translation only. Thus, there are no initial rotational velocities imparted to the payload. In addition, use of the synchronizing drive shafts mechanically distributes the deployment forces to the payload according to the payload's mass properties, i.e., the resultant deployment parameters of the payload are independent of the payload's center of mass. For most applications envisioned, the payload will reach a constant velocity before reaching the ends of the guide rails. This feature of the deployment also minimizes undesirable tip off rates.

Other objects, advantages and novel features of the present invention will become apparent from the following detailed description of the invention when considered in conjunction with the accompanying drawings.

DETAILED DESCRIPTION OF THE PREFERRED EMBODIMENTS

Figure 1:
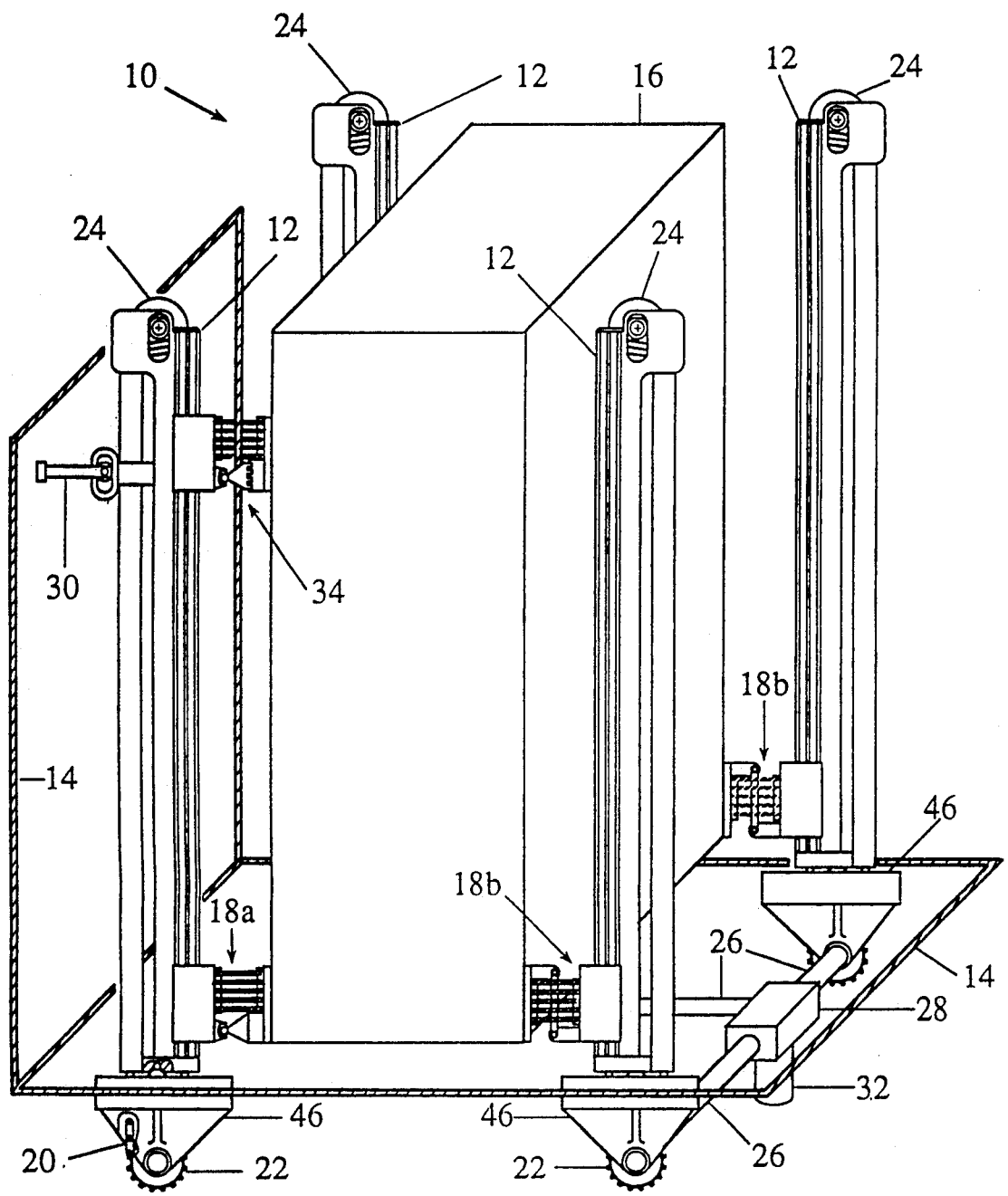
FIG. 1 is a top isometric of the deployment system of the present invention.

Referring to the drawings and characters of reference marked thereon, FIG. 1 illustrates the deployment system of the present invention, designated generally as 10. Parallel linear guide rails 12 are securely supported at their respective bases 46 to a deployment portion 14 of a spacecraft. A payload 16 is engaged to the linear guide rails 12 by means of attach fittings 18. An encapsulated chain 20 (small section only shown for the purposes of figure clarity) is driven by a drive sprocket and is engaged by the attach fittings 18. The drive chains 20 pass over a pulley 24 at the ends of the linear guide rails 12. Drive shafts 26 and associated gear boxes 28 insure precise synchronization between the linear guide rail 12 encapsulated chain 20 drive mechanisms. Since the attach fittings 18 do not completely enclose the guide rails 12, additional guide rail supports 30 that may be needed can be easily provided. The system is powered by electric motor(s) 32 and associated gear box 28.

When power is supplied to the electric motor(s) 32, the system starts to accelerate, turning the synchronizing drive shafts 26, moving the drive chains 20 up and along the linear guide rails 12. The payload attach fittings 18 travel along the guide rails 12, thus accelerating the payload 16 along the desired deployment trajectory. As the payload attach fittings 18 reach the ends of the linear guide rails 12, they disengage from the encapsulated drive chain 20 by virtue of the drive chain 20 moving away from the attach fitting 18 as it passes over the pulley 24 and reverses its direction back toward the drive sprocket 22. Thus, the payload 16 is simply deployed off the ends of the linear guide rails 12. Additional attach fittings 34 may be included as needed for payload 16 stability and/or to react payload 16 flight loads into deployment portion 14 of the spacecraft.

Figure 2:
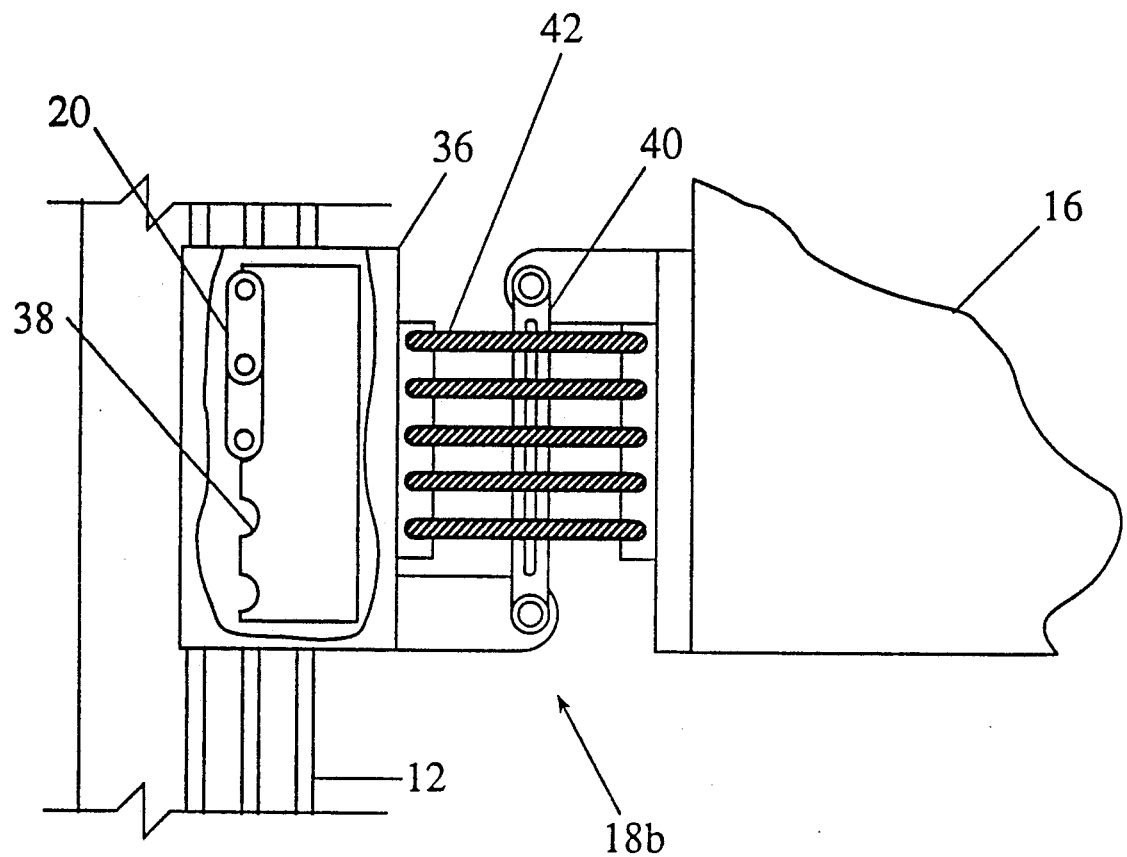
FIG. 2 is an enlarged side view of one of the payload to linear rail attach fittings.

FIG. 2 illustrates a configuration of a payload attach fitting 18. The attach fitting 18 is supported from the payload 16 and couples to the guide rail linear bearing 36. The cut away view illustrates the engagement of the attach fitting 18 to the drive chain 20 by means of a toothed segment 38. This toothed segment 38 is firmly affixed to the linear bearing 36. The attach fitting 18b depicted provides a load path between the linear bearing 36 and the payload 16 through a two force member link 40, i.e., the force is in the direction of the deployment trajectory only. For lateral stability of the payload 16 during the deployment sequence, one attach fitting (primary fitting) 18a transfers all three translational forces between the linear bearing 36 and the payload 16, a second attach fitting 18 (not shown) would transfer two translational forces, one lateral and one vertical (deployment direction), and all other attach fittings 18 would be as depicted in FIG. 2. All attach fittings 18 are supplied with a soft spring 42 between the linear bearing 36 and the payload 16 for the purpose of securing the linear bearing 36 during payload 16 orbital operations.

Figure 3:
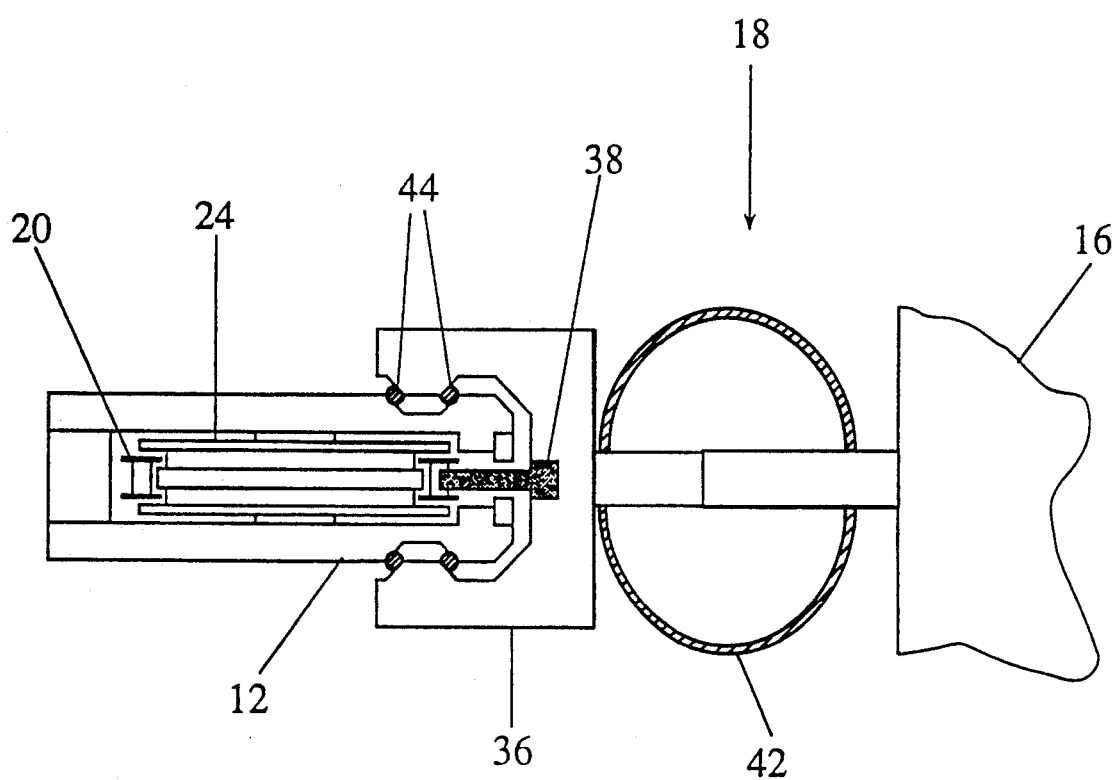
FIG. 3 is a top view of the linear guide rail with payload and attach fitting shown.

A top view of the linear guide rail 12 is provided in FIG. 3. The linear bearing 36 depicted is a standard recirculating ball 44 type. Note that the linear bearing 36 does not completely enclose the guide rail 12. Such bearings will minimize frictional effects. However, the present invention is not limited to these particular type of bearings or guide rails. As the drive chain 20 passes over the pulley 24, it rolls away from the toothed segment 38, thus disengaging the linear bearing 36. (The drive chain 20 is not illustrated passing over the pulley for the purpose of drawing clarity.) The toothed segment 38 is fully disengaged from the drive chain 20 just as the linear bearing 36 reaches the end of the guide rail. The payload 16 is then free to travel from the deployment portion of the spacecraft 14.

Figure 4:
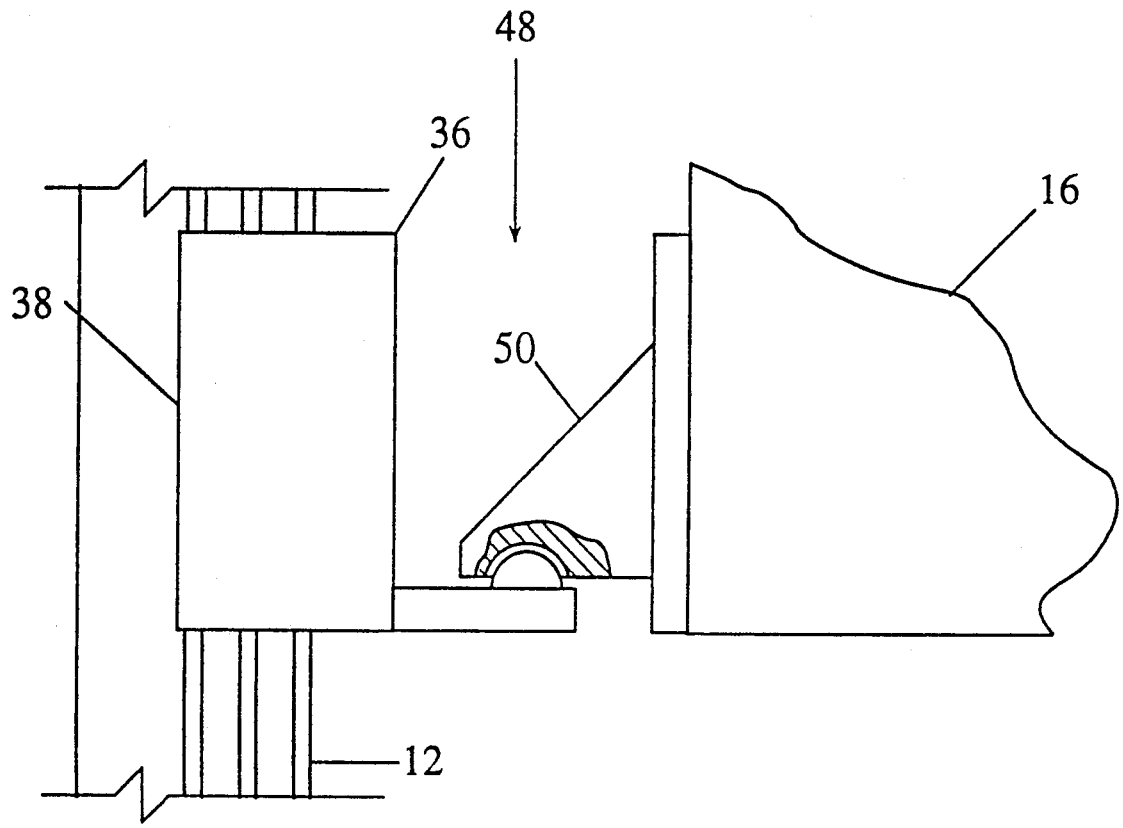
FIG. 4 illustrates an alternate type of payload attach fitting.

An alternate type of payload to linear guide rail attach fitting 48 is shown in FIG. 4. In this configuration, the linear bearing 36 remains on the guide rail 12, provisions having been made for its capture at the end of the guide rail 12. With such a configuration, the "fly away" weight of the payload fitting 50 has less of an impact on payload 16 on-orbit performance.

Figure 5:
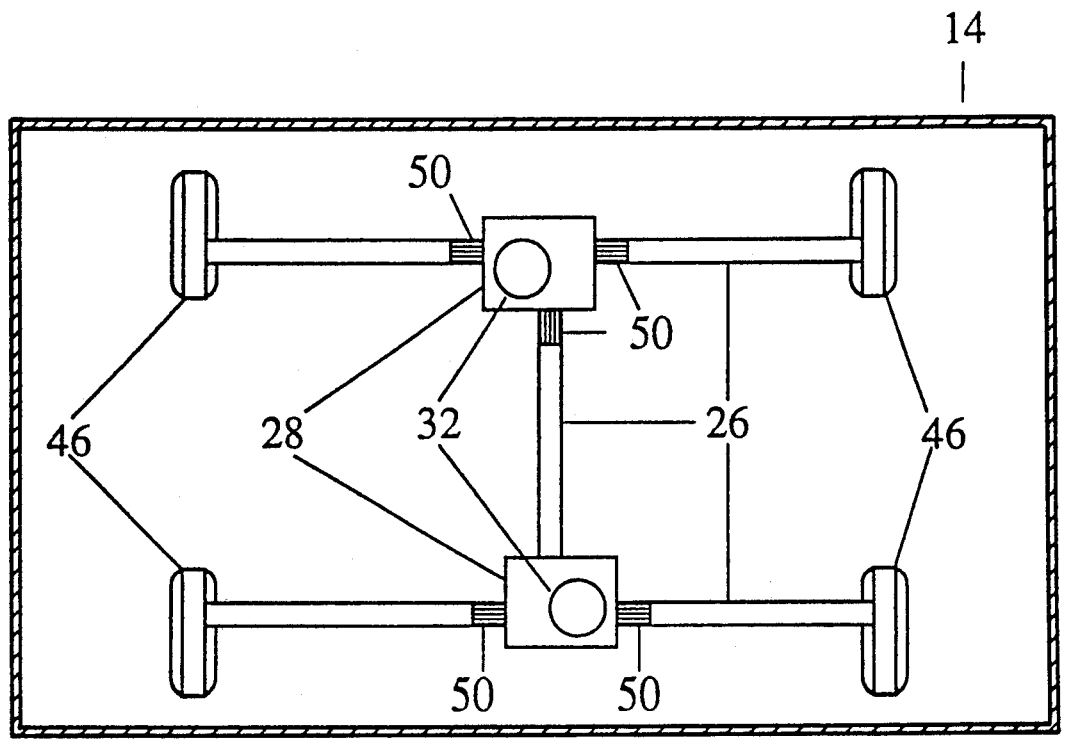
FIG. 5 illustrates the use of four parallel linear guide rails and two electric motor drives.
Figure 6:
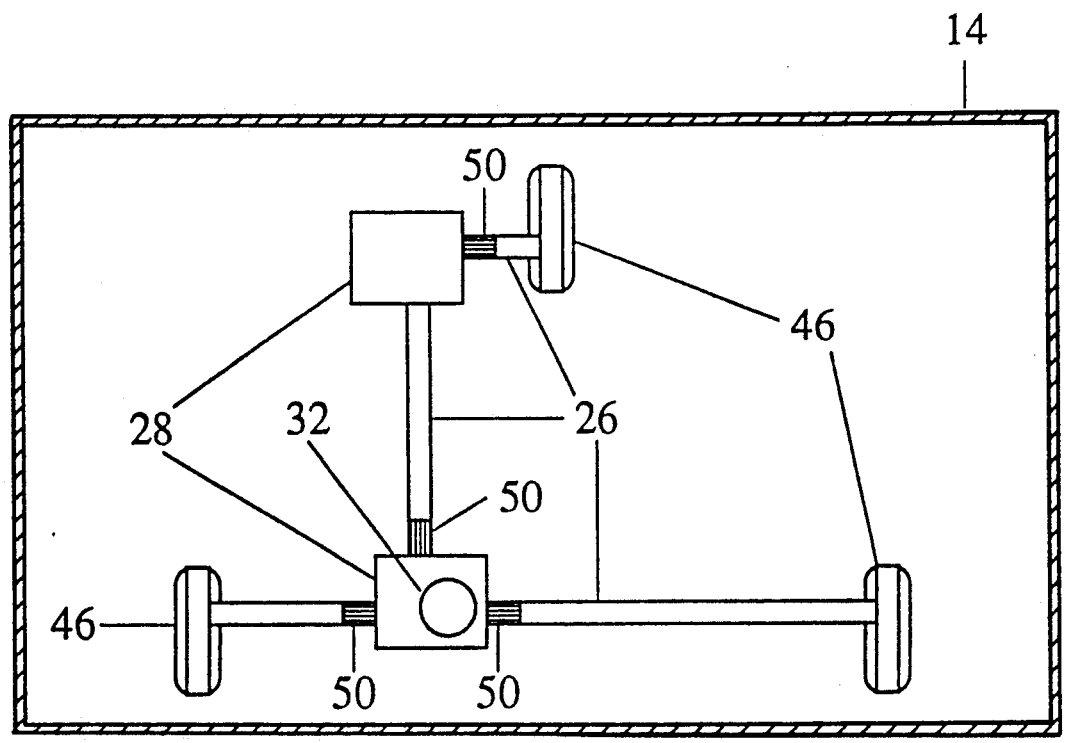
FIG. 6 illustrates the use of three parallel linear guide rails and an electric motor drive.

The bottom views depicted in FIGS. 5 and 6 show typical layouts of the present invention 10 utilizing four and three parallel guide rails (not visible in these views) and one and two electric motor drives 32, respectively. Large rectangular payloads would most likely utilize the system depicted in FIG. 5. Lighter weight payloads, especially cylindrical payloads could utilize the system shown in FIG. 6. If needed, sliding spline fittings 50 can be incorporated into the drive shafts 26 for allowing differential thermal expansion/contraction between the various components.

Figure 7:
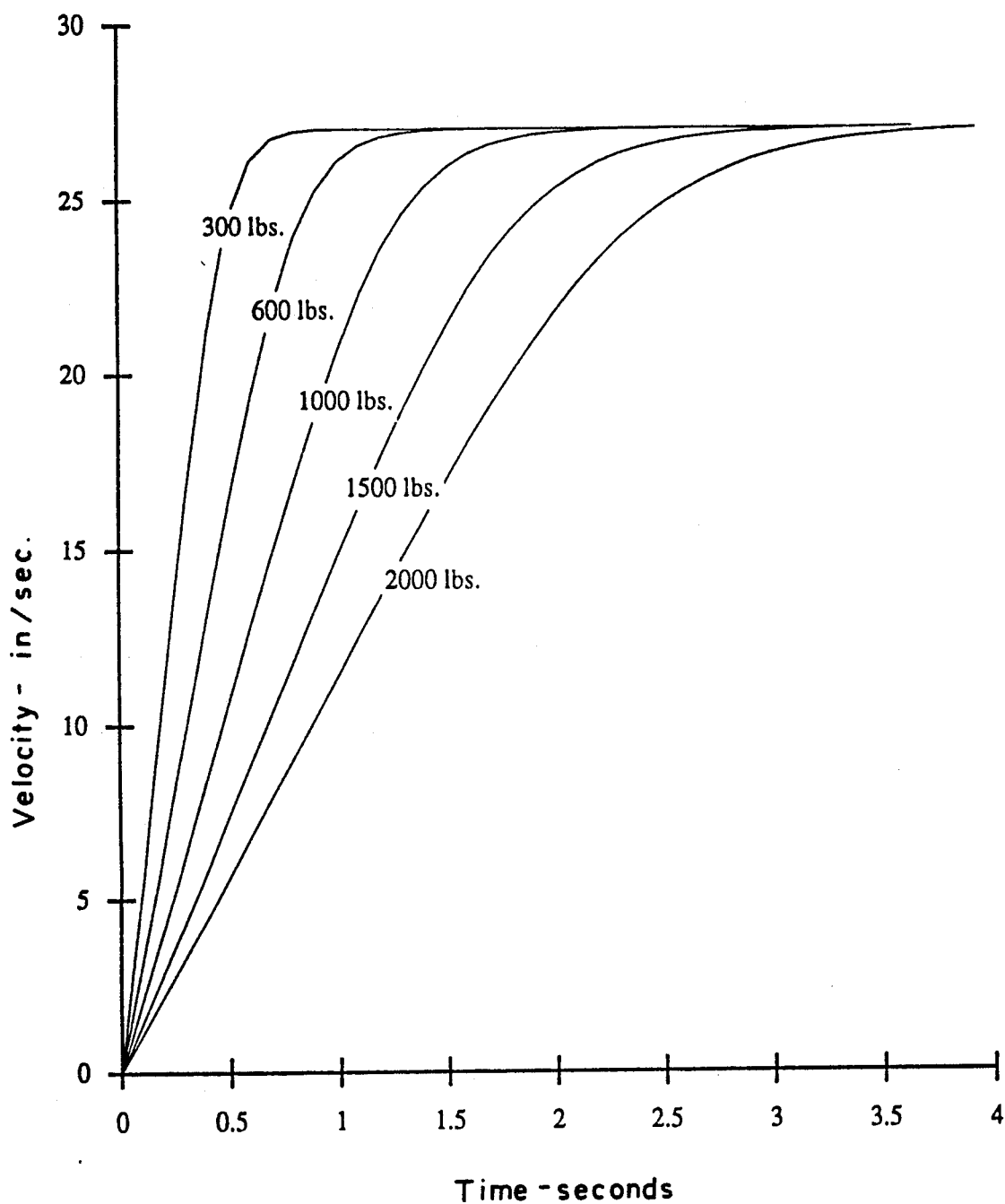
FIGS. 7 and 8 graphically illustrate time histories of the payload deployment velocities and accelerations for a range of payload weights.
Figure 8:
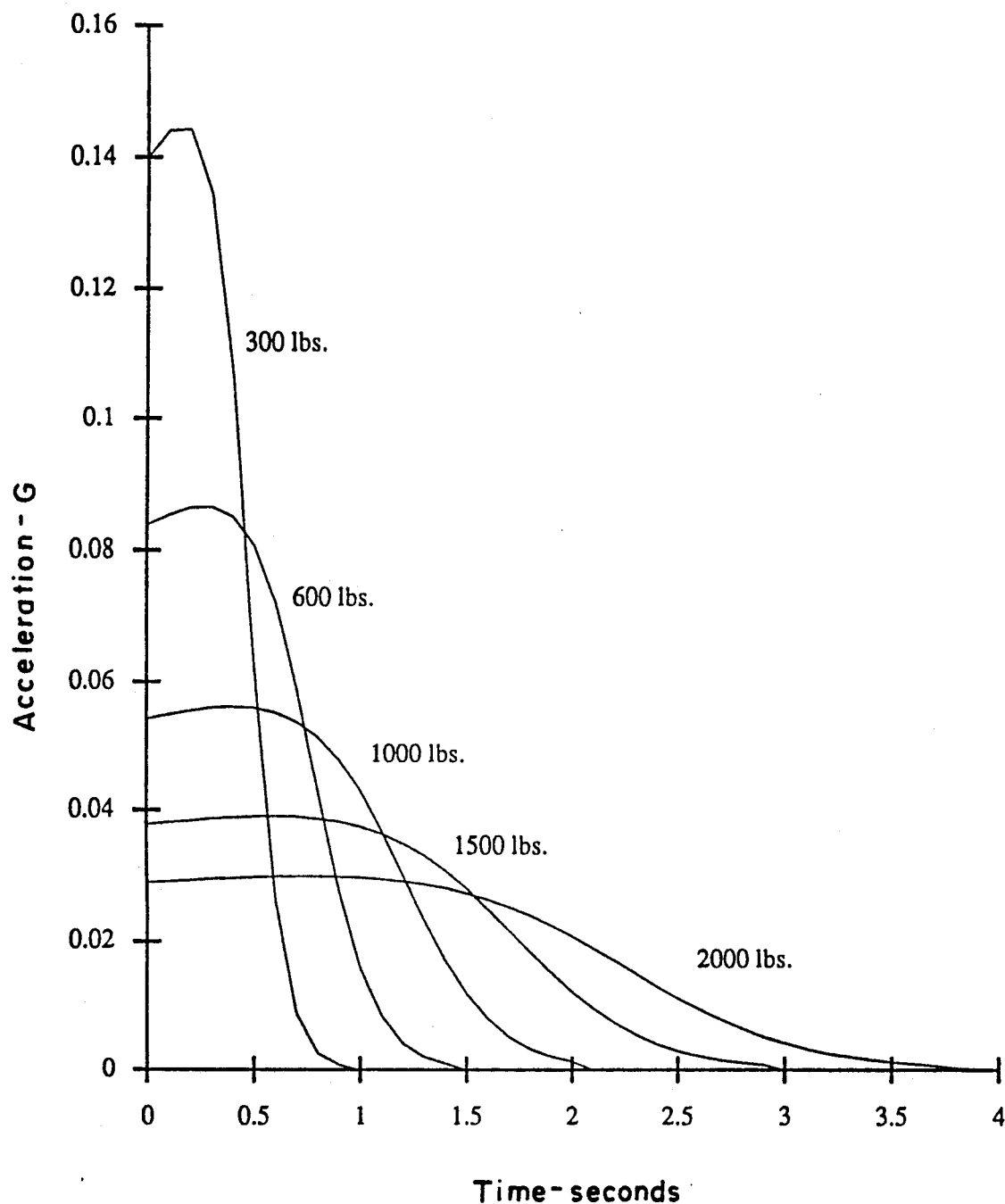

FIGS. 7 and 8 summarize the analytic results for a typical deployment system based on the present invention 10. The analysis was performed for payload 16 weights of 300, 600, 1,000, 1,500 and 2,000 pounds. The system parameters used in the analysis are as follows: linear guide rail 12 length is 6 feet, drive sprocket 22 radius is 1 inch, system friction is 6 in.-lbs., gear ratio output from electric motors 32 is 30 to 1, gearbox 28 efficiency is 0.7, and the system mechanical inertia is estimated to be 0.015 lb-sec$^2$-in. The two electric drive motors' 32 characteristics are identical to those motors used to operate the Space Shuttle payload active retention latches. The maximum torque output of these motors is only about 1.4 in-lbs., thus the system is operable with very small motor drives. FIG. 7 illustrates that the deployment velocity is insensitive to the payload weight, a highly desirable feature for such a system. The deployment sequence time is only 4 seconds for the heavier payload. FIG. 8 illustrates the low acceleration levels imposed by the system upon the payloads, less than 0.15 gravity for the lightest payload. Notice also that the payloads are experiencing zero acceleration as they reach the ends of the linear guide rails.

Obviously, many modifications and variations of the present invention are possible in light of the above teachings. It is therefore to be understood that, within the scope of the appended claims, the invention may be practiced otherwise than as specifically described.

What is claimed and desired to be secured by Letters Patent of the United States is:

1. A payload deployment system for a spacecraft, comprising:
   a) a plurality of parallel guide rails securely supported at their respective bases to a deployment portion of said spacecraft, at least two of said guide rails having a drive chain for translating said payload along the length of and off of the end of said guide rail;
   b) a plurality of synchronizing drive shafts coupled to said chain driven guide rails to insure precise timing between said drive chains;
   c) drive motor/output gear box means, for providing driving force to said drive chains; and
   d) payload attach fittings securely affixed to said payload for engagement with said guide rails and said drive chains, wherein prior to deployment the payload is mounted to said guide rails and engaged to said drive chains and, during deployment, synchronous rotation of said drive shafts powers said drive chains, forcing said payload attach fittings to translate along and off of said guide rails, said guide rails providing a precise trajectory for the payload and said drive chains, thereby, providing the force to accelerate and eject the payload from said spacecraft.

2. The system of claim 1 wherein each guide rail has an associated drive chain.

3. The system of claim 1 wherein each guide rail has such a length and the motor/output gear box operational parameters are so selected such that the payload experiences substantially zero acceleration at the instance of separation from said guide rails, thereby minimizing undesirable tip off rates.

4. The system of claim 1 wherein said payload attach fittings do not completely enclose each said guide rail, said system further including:
   support means along said guide rails to increase said guide rail's stiffness and/or stability and to react payload flight loads into said deployment portion of said spacecraft.

5. The system of claim 1 wherein said drive motor includes an electric motor drive.

6. The system of claim 1 wherein said drive chain is encapsulated within the guide rail.

* * * * *